(12) United States Patent
Zhu et al.

(10) Patent No.: US 11,050,368 B2
(45) Date of Patent: Jun. 29, 2021

(54) APPARATUS FOR CONTROLLING ROTATION SPEED OF MOTOR, MOTOR AND FOOD PROCESSING EQUIPMENT

(71) Applicant: SHENZHEN H&T INTELLIGENT CONTROL CO., LTD., Guangdong (CN)

(72) Inventors: Jingfeng Zhu, Guangdong (CN); Linlin Pi, Guangdong (CN); Gang Zhou, Guangdong (CN)

(73) Assignee: SHENZHEN H&T INTELLIGENT CONTROL CO., LTD., Guangdong (CN)

( * ) Notice: Subject to any disclaimer, the term of this patent is extended or adjusted under 35 U.S.C. 154(b) by 169 days.

(21) Appl. No.: 16/478,402

(22) PCT Filed: Jan. 25, 2019

(86) PCT No.: PCT/CN2019/073211
§ 371 (c)(1),
(2) Date: Jul. 16, 2019

(87) PCT Pub. No.: WO2020/151006
PCT Pub. Date: Jul. 30, 2020

(65) Prior Publication Data
US 2021/0126563 A1    Apr. 29, 2021

(51) Int. Cl.
*A47J 43/08* (2006.01)
*H02P 6/08* (2016.01)

(52) U.S. Cl.
CPC ............... *H02P 6/08* (2013.01); *A47J 43/08* (2013.01); *H02P 2205/07* (2013.01)

(58) Field of Classification Search
CPC ........ H02P 6/08; H02P 2205/07; H02P 25/14; H02P 7/295; H02P 7/288; H02P 29/027; A47J 43/08; G05F 1/66
(Continued)

(56) References Cited

U.S. PATENT DOCUMENTS 3,582,738 A * 6/1971 Claassen ................. H02P 7/295
                                                    318/249
3,854,079 A * 12/1974 Brown ..................... A61G 5/04
                                                    388/829
(Continued)

FOREIGN PATENT DOCUMENTS

| CN | 204190663 | 3/2015 |
| CN | 104660112 | 5/2015 |

(Continued)

*Primary Examiner* — Jorge L Carrasquillo
(74) *Attorney, Agent, or Firm* — Hamre, Schumann, Mueller & Larson, P.C.

(57) ABSTRACT

Disclosed is an apparatus for controlling a rotation speed of a motor, a motor and a food processing equipment. The apparatus includes: a rotation speed feedback circuit and a rotation speed control loop; the rotation speed feedback circuit comprises a rotation speed inducing unit configured to induce a current rotation speed of the motor and output a rotation speed detection signal, and a resistance adjusting unit configured to adjust a total resistance of a resistor unit of the rotation speed control loop according to the rotation speed detection signal; the rotation speed control loop comprises the resistor unit, a first capacitor, a first controllable switch and a second controllable switch.

8 Claims, 4 Drawing Sheets

(58) Field of Classification Search
USPC .................................................... 318/400.05
See application file for complete search history.

(56) References Cited

U.S. PATENT DOCUMENTS

| | | | | |
|---|---|---|---|---|
| 4,158,796 | A * | 6/1979 | Kosak | 318/245 |
| 4,608,953 | A * | 9/1986 | Benvenuti | F02P 11/00 |
| | | | | 123/198 DC |
| 4,985,662 | A * | 1/1991 | Willcocks | H05B 41/36 |
| | | | | 315/90 |
| 7,936,576 | B2 * | 5/2011 | Ham | G05F 1/66 |
| | | | | 363/143 |
| 2007/0114963 | A1 * | 5/2007 | Steiner | H02P 7/288 |
| | | | | 318/772 |
| 2014/0062422 | A1 * | 3/2014 | Gonthier | E06B 3/26305 |
| | | | | 320/166 |
| 2016/0226386 | A1 * | 8/2016 | Fukuta | H02P 29/027 |

FOREIGN PATENT DOCUMENTS

| | | |
|---|---|---|
| CN | 106612090 | 5/2017 |
| CN | 108023474 | 5/2018 |
| JP | 2000139097 | 5/2000 |

* cited by examiner

APPARATUS FOR CONTROLLING ROTATION SPEED OF MOTOR, MOTOR AND FOOD PROCESSING EQUIPMENT

TECHNICAL FIELD

The present disclosure relates to a technical field of motor control, and more particularly to an apparatus for controlling a rotation speed of a motor, a motor and a food processing equipment.

BACKGROUND

Generally, when the motor load difference is larger, the speed of the motor will be affected. For example, in the case of no load or light load, the speed of the motor is required to reduce; while in the case of heavy load, the speed of the motor is required to increase to control the speed of the motor within a reasonable range.

In the related art, the rotation speed control of the motor is implemented in two ways. One way is to use the centrifugal force generated by the rotation of the motor to switch the switch through mechanical transmission to implement the selection of rotation speed of the motor. However, this method has problems of complicated structure, many assemblies, high material cost, low control precision, and high labor cost caused by correcting each motor when assembling. The other way is to use the microprocessor to implement control of the rotation speed of the motor, but this method also has the problem of high cost.

SUMMARY

In view of this, according to various embodiments of the invention, an apparatus for controlling a rotation speed of a motor, a motor and a food processing equipment are provided.

An apparatus for controlling a rotation speed of a motor includes: a rotation speed feedback circuit and a rotation speed control loop;

the rotation speed feedback circuit comprises a rotation speed inducing unit configured to induce a current rotation speed of the motor and output a rotation speed detection signal, and a resistance adjusting unit configured to adjust a total resistance of a resistor unit of the rotation speed control loop according to the rotation speed detection signal;

the rotation speed control loop includes the resistor unit, a first capacitor, a first controllable switch and a second controllable switch; one end of the first capacitor is connected to one end of the resistor unit and there is a first node between the resistor unit and the capacitor; the first node is connected to a first end of the first controllable switch, and a second end of the first controllable switch is connected to a control end of the second controllable switch; wherein, when the motor is powered on, a power supply charges the first capacitor through the motor and the resistor unit; the first controllable switch and the second controllable switch are turned on or off at a charging voltage of the first capacitor to adjust the rotation speed of the motor.

In one embodiment, the rotation speed inducing unit includes:

a first inductance coil, configured to induce the current rotation speed of the motor and output a first Alternating Current (AC) voltage signal;

a first rectifier unit, an input end of which is connected to the first inductance coil, configured to convert the first AC voltage signal into a first Direct Current (DC) voltage signal;

a voltage dividing unit connected to an output end of the first rectifier unit, configured to perform a voltage division processing on the first DC voltage signal to obtain the rotation speed detection signal.

In one embodiment, the first rectifier unit includes:

a first diode, an anode of the first diode being connected to one end of the first inductance coil;

a second capacitor, one end of the second capacitor being connected to a cathode of the first diode, the other end of the second capacitor being connected to the other end of the first inductance coil;

a second diode, a cathode of the second diode being connected to one end of the first inductance coil through a first resistor, and an anode of the second diode being connected to the other end of the first inductance coil.

In one embodiment, the first rectifier unit further includes:

an adjustable resistor, one end of the adjustable resistor being connected to the cathode of the first diode, and the other end of the adjustable resistor being connected to one end of the second capacitor.

In one embodiment, the voltage dividing unit includes N second resistors; the N second resistors are connected in series between both output ends of the first rectifier unit; each of the N second resistors corresponds to one rotation speed detection signal; N is a positive integer;

the resistance adjusting unit includes N resistance adjusting sub-units; a control end of a first one of the N resistance adjusting sub-units is connected to one end of a first one of the N second resistors, a control end of a (i+1)-th one of the N resistance adjusting sub-units is respectively connected to the other end of an i-th one of the N second resistors and one end of a (i±1)-th one of the N second resistors, a control end of a N-th one of the N resistance adjusting sub-units is respectively connected to the other end of a (N−1)-th one of the N second resistors and one end of a N-th one of the N second resistors, $1 \leq i \leq N$;

the resistor unit includes N third resistors which are connected in series; an output end of each one of the N resistance adjusting sub-units is connected in parallel with one third resistor, and each one of the N resistance adjusting sub-units is configured to adjust a parallel resistance of a corresponding third resistor according to a corresponding rotation speed detection signal, to adjust a total resistance of the resistor unit.

In one embodiment, each resistance adjusting sub-unit includes:

a third controllable switch, a first end of the third controllable switch being connected to a trigger power supply, a second end of the third controllable switch being connected to one end of a corresponding third resistor, a third end of the third controllable switch being connected to the other end of the corresponding third resistor;

a fourth controllable switch, a first end of the fourth controllable switch being connected to a fourth end of the third controllable switch, a second end of the fourth controllable switch being connected to the other end of the first inductance coil, a control end of the fourth controllable switch being connected to a control end of the resistance adjusting sub-unit.

In one embodiment, the apparatus further includes: a power supply circuit; wherein, the power supply circuit includes:

a second inductance coil, configured to induce a current rotation speed of the motor and output a second AC voltage signal;

a second rectifier unit an input end of which is connected to the second inductance coil, configured to convert the second AC voltage signal into a second DC voltage signal and output through an output end of the second rectifier unit to provide the trigger power supply.

In one embodiment, the second rectifier unit includes:

a third diode, an anode of the third diode being connected to one end of the second inductance coil;

a third capacitor, one end of the third capacitor being connected to a cathode of the third diode, and the other end of the third capacitor being connected to the other end of the second inductance coil;

a fourth diode, a cathode of the fourth diode being connected to one end of the second inductance coil through a fourth resistor, and an anode of the fourth diode being connected to the other end of the second inductance coil.

A motor includes the above-mentioned apparatus for controlling a rotation speed of a motor.

A food processing equipment includes the above-mentioned motor.

One or more embodiments of the invention will be detailed with reference to the following figures. Other characteristics, purpose and advantages are apparent from the description, figures and claims.

DETAILED DESCRIPTION OF DISCLOSED EMBODIMENTS

In order to make the above objective, characteristics and advantages clearer and easier to understand, the present invention will be detailed hereinafter with reference to the accompanying drawings. The following specific details may facilitate a full understanding of the disclosure. However, the disclosure may be implemented in many different forms and is not limited to the embodiments described herein, those skilled in the art can make similar improvement without violating the connotation of the disclosure. Therefore, the present disclosure is not limited to the following specific embodiments.

Unless otherwise defined, all technical and scientific terms used herein have the same meaning as commonly understood by those skilled in the art belonging to the technical field of the disclosure. The terms used in the description of the present disclosure are for the purpose of describing specific embodiments and is not intended to limit the disclosure. The technical features of the above embodiments may be discretionarily combined. For the sake of brevity of description; all possible combinations of the technical features in the above embodiments are not described. However, as long as there is no contradiction in the combination of these technical features, they are considered to be in the range of the disclosure.

Figure 1:
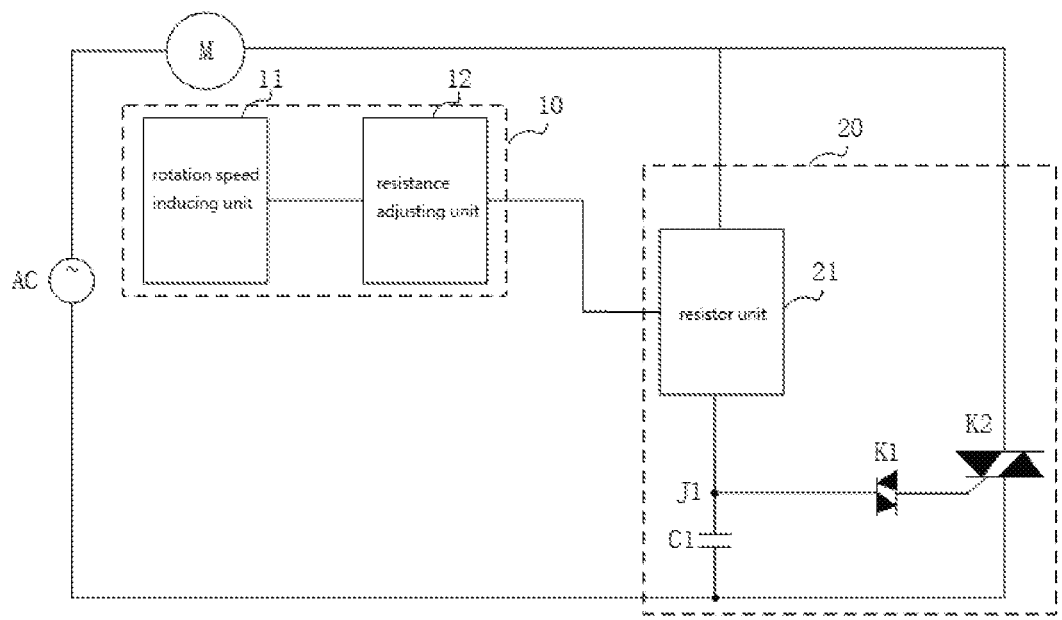
FIG. 1 is a structure diagram of an apparatus for controlling a rotation speed of a motor according to one embodiment.

FIG. 1 is a structure diagram of an apparatus for controlling a rotation speed of a motor according to one embodiment. As shown in FIG. 1, the apparatus for controlling the rotation speed of the motor includes a rotation speed feedback circuit 10 and a rotation speed control loop 20.

The rotation speed feedback circuit 10 includes a rotation speed inducing unit 11 and resistance adjusting unit 12. The rotation speed inducing unit 11 is configured to induce the current rotation speed of the motor M and output a rotation speed detection signal; and the resistance adjusting unit 12 is configured to adjust a total resistance of a resistor unit 21 of a rotation speed control loop according to the rotation speed detection signal. The rotation speed control loop 20 includes a resistor unit 21, a first capacitor C1, a first controllable switch K1 and a second controllable switch K2. One end of the first capacitor C1 is connected to one end of the resistor unit 21 and there is a first node J1 therebetween. The first node J1 is connected to a first end of the first controllable switch K1, and a second end of the first controllable switch K1 is connected to a control end of the second controllable switch K2. When the motor M is powered on, the power supply AC charges the first capacitor C1 through the motor M and the resistor unit 21. The first controllable switch K1 and the second controllable switch K2 are switched on or off at the charging voltage of the first capacitor C1 to adjust the rotation speed of the motor M.

Figure 2:
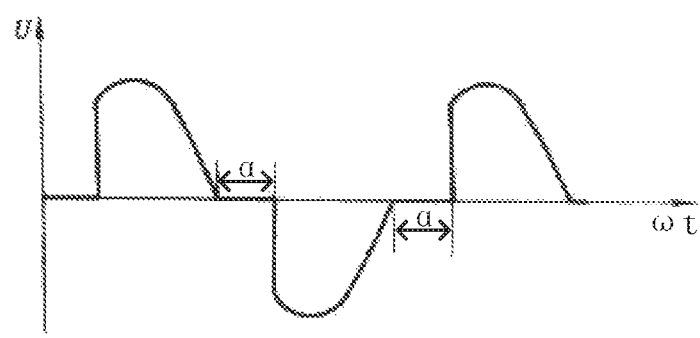
FIG. 2 is a schematic diagram of a conduction angle of a power supply during half period according to one embodiment.

Specifically, the resistor unit 21 may be a plurality of resistors connected in series, or a plurality of resistors connected in parallel. The first controllable switch K1 may be a bidirectional trigger diode, and the second controllable switch K2 may be a silicon controlled (thyristor). As shown in FIG. 1, when the power supply AC is turned on, the current charges the first capacitor C1 through the motor M and the resistor unit 21. Assuming that a trigger voltage of the first controllable switch K1 is Vt, a turn-on voltage of the second controllable switch K2 is Vf, so when a voltage across the first capacitor C1 is less than the absolute value of Vt+Vf, the first controllable switch K1 cannot trigger the turn-on, i.e., the first controllable switch K1 is in the turn-off state, and meanwhile the second controllable switch K2 is in the turn-off state. When the voltage across the first capacitor C1 is greater than or equal to the absolute value of Vt+Vf, the first controllable switch K1 is triggered to turn on, i.e., the first controllable switch K1 is in the turn-on state, and meanwhile the second controllable switch K2 is in the turn-on state. Thus, it is possible to control the conduction angle α of the power supply AC in every half period, specifically as shown in FIG. 2.

The magnitude of the conduction angle α is related to the time when the voltage across the first capacitor C1 is charged to reach the trigger value Vt+Vf. For example, the less time the voltage across the first capacitor C1 is charged to reach the trigger value Vt+Vf, i.e., the faster the voltage is increased, the smaller the conduction angle α is, and vice versa. When the capacitance of the first capacitor C1 is fixed, the increasing speed of the voltage across the first capacitor C1 is related to the total resistance of the resistor unit 21, the smaller the resistance is, the faster the voltage is increase, and vice versa. Thus, it is possible to change the increasing speed of the voltage across the first capacitor C1 through adjusting the magnitude of the total resistance of the resistor unit 21 of the rotation speed control loop 20, so as to change the magnitude of the conduction angle α. The total resistance of the resistor unit 21 can be adjusted in real time based on the current rotation speed of the motor M. For example, it is possible to obtain the voltage or current corresponding to the current rotation speed of the motor M through inducing the current rotation speed of the motor M, so as to adjust the total resistance of the resistor unit 21 according to the voltage or current in order to implement the adjustment of the conduction angle α. The magnitude of the conduction angle α determines the rotation speed of the motor M, for example, the larger the conduction angle α is, the less the power energy loaded on the motor M is, such that the rotation speed of the motor M can be decreased; the smaller the conduction angle α is, the more the power energy loaded on the motor M is, such that the rotation speed of the motor M can be increased. Therefore, through adjusting the total resistance of the resistor unit 21 based on the current rotation speed of the motor M, it is possible to implement the adjustment of the increasing speed of the voltage across the first capacitor C1, so as to implement the adjustment of the conduction angle α accordingly implement the adjustment of the rotation speed of the motor M, and then achieve the purpose of controlling the rotation speed of the motor M.

Specifically, a food processing equipment is taken as an example. When the agitator works, the power supply AC is powered on, the current charges the first capacitor C1 through the motor M and the resistor unit 21. When the voltage across the first capacitor C1 reaches the trigger voltage Vt+Vf, the first controllable switch K1 and the second controllable switch K2 are turned on to control the operation of the motor M. In the process of the operation of the motor M, the rotation speed inducing unit 11 outputs a rotation speed detection signal according to the current rotation speed of the motor M. For example, the signal may be a voltage signal corresponding to the current rotation speed of the motor M, the faster the rotation speed is, the greater the amplitude of the rotation speed detection signal is, and vice versa. Meanwhile, the resistance adjusting unit 12 adjusts the total resistance of the resistor unit 21 according to the rotation speed detection signal. For example, when the rotation speed of the motor M is changed, the amplitude of the corresponding rotation speed detection signal is also changed. When the rotation speed detection signal is above or below a preset threshold signal, the resistance adjusting unit 12 can adjust the number of the resistors connected in series or parallel in the resistor unit 21 through corresponding switches, to adjust the total resistance of the resistor unit 21. Because the total resistance of the resistor unit 21 is changed, the time when the voltage across the first capacitor C1 reaches the trigger value Vt+Vf is also changed, such that the time when the first controllable switch K1 and the second controllable switch K2 are turned on is changed, and then the conduction angle α of the power supply AC in every half period is changed. For different conduction angle α, the motor has different rotation speed, and then the adjustment of the rotation speed of the motor M is implemented.

In the above-mentioned embodiment, through that the rotation speed inducing unit induces the current rotation speed of the motor and outputs the rotation speed detection signal, and the resistance adjusting unit adjusts the total resistance of the resistor unit of the rotation speed control loop according to the rotation speed detection signal, and when the motor is powered on, the power supply charges the first capacitor through the motor and the resistor unit, the first controllable switch and the second controllable switch are turned on or off at the charging voltage of the first capacitor, to adjust the rotation speed of the motor. This not only enables accurate control of the rotation speed of the motor, but also has the advantages of simple structure, simple assembly, low cost, reliable performance and no manual correction.

Figure 3:
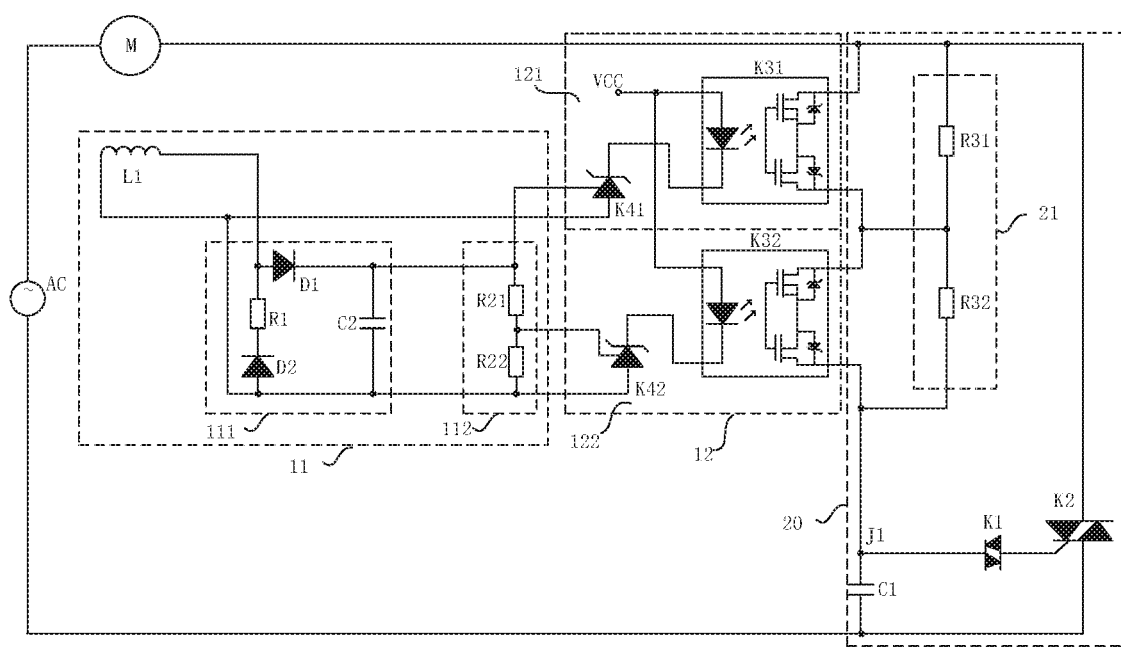
FIG. 3 is a circuit diagram of an apparatus for controlling a rotation speed of a motor according to one embodiment.

In one embodiment, as shown in FIG. 3, the rotation speed inducing unit 11 includes: a first inductance coil L1, a first rectifier unit 111 and a voltage dividing unit 112. The first inductance coil L1 is configured to induce the current rotation speed of the motor M and output a first Alternating Current (AC) voltage signal. An input end of the first rectifier unit 111 is connected to the first inductance coil L1 to convert the first AC voltage signal into a first Direct Current (DC) voltage signal. The voltage dividing unit 112 is connected to an output end of the first rectifier unit 111, to perform the voltage division processing on the first DC voltage signal to obtain the rotation speed detection signal.

Furthermore, as shown in FIG. 3, the first rectifier unit 111 includes: a first diode D1, a second capacitor C2, a second diode D2 and a first resistor R1. An anode of the first diode D1 is connected to one end of the first inductance coil L1, one end of the second capacitor C2 is connected to a cathode of the first diode D1, and the other end of the second capacitor C2 is connected to the other end of the first inductance coil L1. The cathode of the second diode D2 is connected to one end of the first inductance coil L1 through the first resistor R1, and the anode of the second diode D2 is connected to the other end of the first inductance coil L1.

Specifically, as shown in FIG. 3, the rotation speed inducing unit 111 may consist of the first inductance coil L1, the first rectifier unit 111 and the voltage dividing unit 112. In the actual application, the first inductance coil L1 can be implanted into the motor M. Thus, when the motor M is powered on, the rotor of the motor M rotates, and the magnet on the rotor cuts the first inductance coil L1, the first inductance coil L1 will generate an induced electromotive force; which is an AC voltage signal, i.e., a first AC voltage signal. After that, the first rectifier unit 111 rectifies the first AC voltage signal, for example, through the first diode D1 and the second capacitor C2 in the first rectifier unit 111 to obtain the first DC voltage signal; the second diode D2 is a free-wheeling diode. Subsequently, the voltage dividing unit 112 performs the voltage dividing on the first DC voltage signal to obtain the rotation speed detection signal. For example, the voltage dividing unit may be formed by one or more resistors connected in series; the rotation speed detection signal, i.e., a voltage signal on the resistor, may be one or more, which can be selected according to the actual requirement.

In one embodiment, the voltage dividing unit 112 may include N second resistors (respectively denoted as R21, R22, . . . , R2N, and N is a positive integer). The N second resistors are connected in series between both output ends of the first rectifier unit 111, and each second resistor corresponds to one rotation speed detection signal. The resistance adjusting unit 12 includes N resistance adjusting sub-units (respectively denoted as 121, 122, . . . , 12N). A control end of the first resistance adjusting sub-unit 121 is connected to one end of the first one R21 of the second resistors; a control end of the (i+1)-th resistance adjusting sub-unit 12(i+1) is respectively connected to one end of the i-th one R2i of the second resistors and one end of the (i+1)-th one R2(i+1) of the second resistors; a control end of the N-th resistance adjusting sub-unit 12N is respectively connected to one end of the (N−1)-th one R2(N−1) of the second resistors and one end of the N-th one R2N of the second resistors, and 1≤i≤N. The resistor unit 21 includes N third resistors (respectively denoted as R31, R32, . . . , R3N). The N third resistors are connected in series; an output end of each resistance adjusting sub-unit is connected to one third resistor in parallel; and each resistance adjusting sub-unit is configured to adjust the parallel resistance of the corresponding third resistor according to the corresponding rotation speed detection signal, to adjust the total resistance of the resistor unit 21.

Specifically, the number of the second resistor, the resistance adjusting sub-unit and the third resistor can be set according to the actual conditions. For convenience of illustration, the following is an example in which the number of the second resistors, the resistance adjusting sub-units and the third resistors are two.

As shown in FIG. 3, after the power supply AC is turned on, the current charges the first capacitor C1 through the motor M, the output end of the first resistance adjusting sub-unit 121, the first one R31 of the third resistors, the output end of the second resistance adjusting sub-unit 122 and the second one R32 of the third resistors. When the voltage across the first capacitor C1 reaches the trigger value Vt+Vf, the first controllable switch K1 and the second controllable switch K2 are turned on, and the motor M is operated.

During the operation of the motor M, the first inductance coil L1 induces the current rotation speed of the motor M and outputs a first AC voltage signal; the first rectifier unit 111 rectifies the first AC voltage signal to obtain a first DC voltage signal; the voltage dividing unit 112 performs voltage division processing on the first DC voltage signal, and obtains a first rotation speed detection signal V1 at one end of the first one R21 of the second resistors and a second rotation speed detection signal V2 at one end of the second one R22 of the second resistors; the amplitudes of the first rotation speed detection signal V1 and the second rotation speed detection signal V2 are proportional to the current rotation speed of the motor M. Then, the first resistance adjusting sub-unit 121 adjusts the parallel resistance of the first one R31 of the third resistors according to the first rotation speed detection signal V1, and the second resistance adjusting sub-unit 122 adjusts the parallel resistance of the second one R32 of the third resistors according to the second rotation speed detection signal V2, so as to implement the adjustment of the total resistance of the resistor unit 21 and then implement the adjustment of the rotation speed of the motor M. For example, according to the forgoing analysis, the smaller the total resistance of the resistor unit 21 is, the faster the voltage across the first capacitor C1 is increased, the smaller the conduction angle α is, the higher the rotation speed of the motor M is, and vice versa. In this way, it is possible to perform short circuit on the first one R31 of the third resistors or connect it in parallel with a smaller resistor through the first resistance adjusting sub-unit 121, and perform short circuit on the second one R32 of the third resistors or connect it in parallel with a smaller resistor through the second resistance adjusting sub-unit 122, such that the total resistance of the resistor unit 21 is reduced and thereby maximizing the rotation speed of the motor M; or, it is possible to perform short circuit on the first one R31 of the third resistors or connect it in parallel with a smaller resistor through the first resistance adjusting sub-unit 121, to increase the total resistance of the resistor unit 21 and thereby reducing the rotation speed of the motor M; or, it is possible to connect the first one R31 of the third resistors with one larger resistor (maybe infinite parallel through the first resistance adjusting sub-unit 121, and connect the second one R32 of the third resistors with one larger resistor (maybe infinite) in parallel through the second resistance adjusting sub-unit 122, such that the total resistance of the resistor unit 2.1 is increased and thereby minimizing the rotation speed of the motor M.

Specifically, assuming that in general state, the first resistance adjusting sub-unit 121 connects the first one R31 of the third resistors in parallel with one very small resistor, and the second resistance adjusting sub-unit 122 connects the second one R32 of the third resistors in parallel with one very small resistor, then after the power supply is turned on, the power supply AC charges the first capacitor C1 through the motor M and the resistors connected in parallel. When the voltage across the first capacitor C1 reaches the trigger value Vt+Vf, the first controllable switch K1 and the second controllable switch K2 are turned on, and the motor M is operated. During the operation of the motor M, the first inductance coil L1 induces the current rotation speed of the motor M, and finally the first rotation speed detection signal V1 is output at one end of the first one R21 of the second resistors, the second rotation speed detection signal V2 is output at one end of the second one R22 of the second resistors, and the amplitudes of the first rotation speed detection signal V1 and the second rotation speed detection signal V2 are continuously increased as the rotation speed is continuously increased. When the first rotation speed detection signal V1 reaches a corresponding threshold signal, the first resistance adjusting sub-unit 121 will connect the first one R31 of the third resistors in parallel with one very large resistor, the total resistance of the resistor unit 21 will be increased, a time duration during which the first capacitor C1 is charged to reach the trigger value Vt+Vf will be increased, and the rotation speed of the motor M will be reduced. When the second rotation speed detection signal V2 reaches a corresponding threshold signal, the second resistance adjusting sub-unit 122 will connect the second one R32 of the third resistors in parallel with one very large resistor, the total resistance of the resistor unit 21 will be increased, a time duration during which the first capacitor C1 is charged to reach the trigger value Vt+Vf will be increased, and the rotation speed of the motor M will be reduced. Therefore, it is possible to implement the adjustment of the total resistance of the resistor unit according to the current rotation speed of the motor through the resistance adjusting unit, consequently implement the adjustment of the rotation speed of the motor and accordingly implement the control of the rotation speed of the motor.

In one embodiment, as shown in FIG. 3, each resistance adjusting sub-unit includes: a third controllable switch (such as third controllable switches K31, K32) and a fourth controllable switch (such as fourth controllable switches K41, K42). A first end of the third controllable switch is connected to a trigger power supply VCC, a second end of the third controllable switch is connected to one end of the corresponding third resistor, a third end of the third controllable switch is connected to the other end of the corresponding third resistor. A first end of the fourth controllable switch is connected to a fourth end of the third controllable switch, a second end of the fourth controllable switch is connected to the other end of the first inductance coil L1, and a control end of the fourth controllable switch is connected to a control end of the resistance adjusting sub-unit.

Specifically, the following is an example in which the numbers of the second resistor, the resistance adjusting sub-unit and the third resistor are still two. With reference to FIG. 3, a corresponding detection circuit or a detection device such as the fourth controllable switch K41 is disposed at one end of the first one R21 of the second resistors; and a corresponding detection circuit or a detection device such as the fourth controllable switch K42 is disposed at one end of the second one R22 of the second resistors. The fourth controllable switches K41 and K42 are both TL431, and the threshold signals of the fourth controllable switches K41 and K42 are both set as Vr. Meanwhile, one third controllable switch K31 is disposed between the fourth controllable switch K41 and the first one R31 of the third resistors, to adjust the parallel resistance of the first one R31 of the third resistors; and one third controllable switch K32 is disposed between the fourth controllable switch K42 and the second one R32 of the third resistors, to adjust the parallel resistance of the second one R32 of the third resistors. The third controllable switches K31 and K32 are both normally closed devices (i.e., which is in a closed state when there is no trigger signal, and in a disconnected state when there is a trigger signal), for example, are both solid state relays or optocoupler thyristors.

Because the third controllable switches K31 and K32 are both normally closed devices, after the third controllable switches K31 and K32 are powered on, the output ends of the third controllable switches K31 and K32 will be in the closed state. For example, with reference to FIG. 3, when the third controllable switches K31 and K32 are both optocoupler thyristors, and powered on by the trigger power supply VCC without any trigger signal, the output of the optocoupler thyristor will be in the closed state, and the output impedance of the optocoupler thyristor is Ron, and Ron is much smaller than the resistance of the third resistor; after the third resistor is connected to the optocoupler thyristor in parallel with a parallel resistance about Ron which is a very small value. When the trigger power supply VCC energizes the optocoupler thyristor and has a trigger signal, the output end of the optocoupler thyristor will be in the disconnected state, the output impedance Ron of the optocoupler thyristor is much greater than the resistance of the third resistor, after the third resistor is connected in parallel with the optocoupler thyristor, the parallel resistance is approximately equal to the resistance of the third resistor, which is a greater value relative to Ron.

Thus, based on the above content, after the trigger power supply VCC energizes the third controllable switches K31 and K32, the output ends of the third controllable switches K31 and K32 are both in the closed state, and this moment the total resistance of the resistor unit 21 is minimum, the conduction angle α is minimum, the power energy provided to the motor M by the power supply ACC will be maximum, and the rotation speed of the motor M will be faster and faster. With the increase of the rotation speed of the motor M, the first rotation speed detection signal V1 and the second rotation speed detection signal will be gradually increased. According to the Ohm's law V1=I*(R21±R22), V2=I*R22, it can be known that V1>V2, thus during the process of continuously increasing the rotation speed of the motor M, V1 will reach the threshold signal Vr first, the fourth controllable switch K41 is turned on, meanwhile a luminous diode of the third controllable switch K31 is turned on and triggers the output end MOSFET to turn off, the output end of the third controllable switch K31 is turned off. Because the output impedance Ron of the third controllable switch K31 after turning off is much greater than the resistance of the first one R31 of the third resistors, thus the total resistance of the resistor unit 21 will be increased, the conduction angle α will be increased, the power energy obtained by the motor M will be reduced, and consequently such that the rotation speed of the motor M is reduced. If this moment the second rotation speed detection signal V2 is still greater than the threshold signal, accordingly, the output end of the third controllable switch K32 will be turned off, the total resistance of the resistor unit 21 will be further increased, the conduction angle α will be further increased, the power energy obtained by the motor M will be further reduced, and consequently such that the rotation speed of the motor M is further reduced. Therefore, it is possible to implement the adjustment of the total resistance of the resistor unit according to the current rotation speed of the motor through the resistance adjusting unit, and accordingly implement the adjustment of the rotation speed of the motor.

It should be noted that, the above examples are all described in detail by taking two second resistors, two resistance adjusting sub-units and two third resistors as examples, and for the number of the second resistor, the resistance adjusting sub-unit and the third resistor as one, three or more, reference may also be made to the above illustration, and not detailed here.

Figure 4:
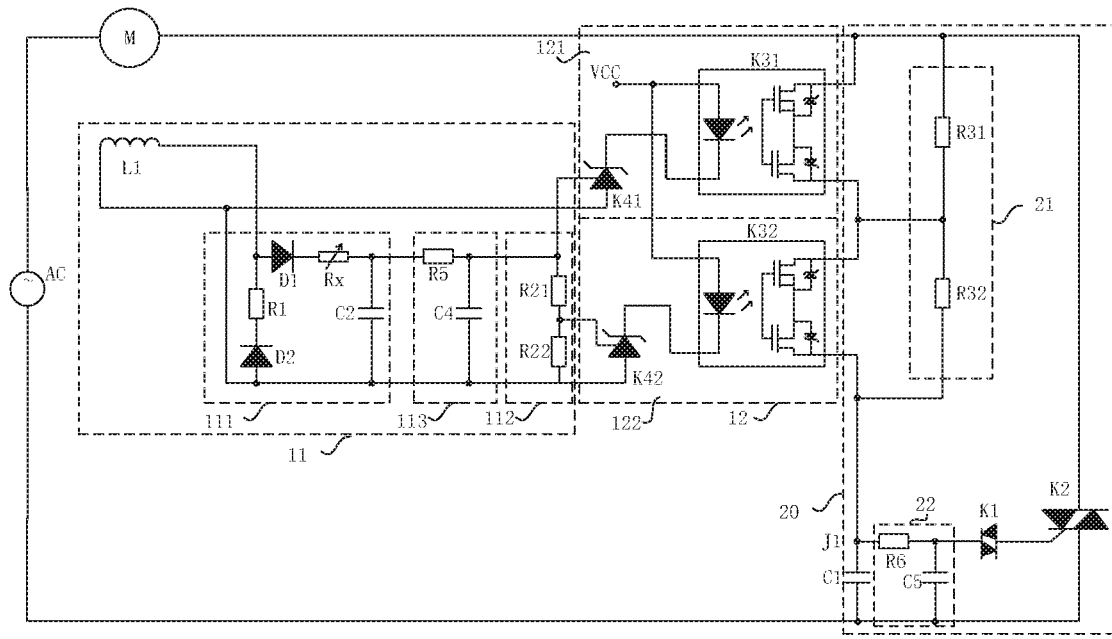
FIG. 4 is a circuit diagram of an apparatus for controlling a rotation speed of a motor according to another embodiment.

In one embodiment, as shown in FIG. 4, the rotation speed inducing unit 11 further includes a first filter unit 113 which is configured to filter the first DC voltage signal output from the first rectifier unit 111 to obtain a stable first DC voltage signal, accordingly such that a rotation speed detection signal obtained after the voltage division processing performed by the voltage dividing unit 112 is more stable. Furthermore, the first filter unit 113 may be an RC filter circuit consisting of a fifth resistor R5 and a fourth capacitor C4, of course it may also be other filter circuit, not limited here.

In one embodiment, as shown in FIG. 4, the rotation speed control loop further includes a second filter unit 22 which is configured to filter the voltage at one end of the first capacitor C1 to ensure that the control signal input into the first controllable switch K1 is a stable signal, and accordingly ensure that the first controllable switch K1 can be controllably turned on or off. Furthermore, the second filter unit 22 may be an RC filter circuit consisting of a sixth resistor R6 and a fifth capacitor C5, of course may be other filter circuit, not limited here.

In one embodiment, as shown in FIG. 4, the first rectifier unit 111 further includes an adjustable resistor Rx one end of which is connected to the cathode of the first diode D1, and the other end is connected to one end of the second capacitor C2. The control of the rotation speed of the motor M can be implemented through adjusting the magnitude of the resistance of the adjustable resistor Rx.

Specifically, with reference to FIG. 4, assuming that the induced electromotive force generated by the first inductance coil L1 is E which is proportional to the current rotation speed Vx of the motor M. Because the first rectifier unit 111 is a half-wave rectifier unit, the generated induction current I is about $$I=(\tfrac{1}{2})E/R=(\tfrac{1}{2})E/(Rx+R5+R21+R22),$$

so the first rotation speed detection signal V1=I*(R21+R22), and the second rotation speed detection signal V2=I*R22, wherein R5, R21, R22 are fixed values. It can be known from the above formulas, the first rotation speed detection signal V1 and the second rotation speed detection signal V2 depends on two variables: the current rotation speed Vx of the motor M and a variable resistor Rx. Further, the closing and disconnecting of the first resistance adjusting sub-unit 121 and the second resistance adjusting sub-unit 122 may provide three different power energies to the motor M as follows:

(i) both the first resistance adjusting sub-unit 121 and the second resistance adjusting sub-unit 122 are in the closed state, this moment the conduction angle α is minimum, the maximum power energy loaded on the motor M is denoted as Pmax, assuming staying in this state, the maximum rotation speed reached by the motor M is Vmax.

(ii) the first resistance adjusting sub-unit 121 is disconnected first, and the second resistance adjusting sub-unit 122 keeps closed, this moment the conduction angle α is less than that in the case (i), and the power energy loaded on the motor M is less than that in the case (i) and denoted as Pmid, assuming staying in this state, the rotation speed of the motor M is less than the maximum rotation speed Vmax and denoted as Vmid.

(iii) both the first resistance adjusting sub-unit 121 and the second resistance adjusting sub-unit 122 are in the disconnected state, this moment the conduction angle α is maximum, and the power energy loaded on the motor M is minimum and denoted as Pmin, assuming staying in this state, the rotation speed of the motor M can reach the minimum rotation speed Vmin.

Assuming that, when the resistance of the adjustable resistor Rx is adjusted to be a larger value, the motor M needs a higher rotation speed to make the first rotation speed detection signal V1 and the second rotation speed detection signal V2 reach the trigger voltage Vr; when the resistance of the adjustable resistor Rx is adjusted to be a smaller value, the motor M can make the first rotation speed detection signal V1 and the second rotation speed detection signal V2 reach the trigger voltage Vr at a lower rotation speed. Therefore, if currently it is needed to adjust a rotation speed V1 between Vmin and Vmid, then it is only needed to adjust the resistance of the adjustable resistor Rx, such that when the rotation speed of the motor M is greater than V1, both the first rotation speed detection signal V1 and the second rotation speed detection signal V2 can reach the trigger voltage Vr. In this way, the first resistance adjusting sub-unit 121 and the second resistance adjusting sub-unit 122 can be disconnected simultaneously, so as to reduce the rotation speed of the motor M; when the rotation speed of the motor M is lower than V1, the second rotation speed rotation signal V2 will be lower than the trigger voltage Vr, the second resistance adjusting sub-unit 122 is closed so as to increase the rotation speed of the motor M, from this the rotation speed of the motor M will float up and down on V1, the second resistance adjusting sub-unit 122 is switched back and forth between the closed and the disconnected state, such that the rotation speed of the motor M achieves a dynamic equilibrium and finally is stabilized around V1. By parity of reasoning, multiple gear positions such as V2, V3, V4, . . . can be set between the Vmin and Vmid, or between the Vmid and Vmax. From this, it is possible to implement the control of the rotation speed of the motor M through adjusting the magnitude of the resistance of the adjustable resistor Rx.

It should be noted that, two rotation speed intervals Vmin-Vmid and Vmid-Vmax are set in the embodiment because when the needed rotation speed of the motor M is between the interval Vmin–Vmid, if the rotation speed span is large and there is no partition between the interval for control, the rotation speed of the motor M will have a large swing near the set rotation speed. Thus, the rotation speed interval can be set according to the rotation speed range of the gear position and acceptable rotation speed swing magnitude, i.e., the number of the rotation speed interval can be increased or decreased according to the actual requirement, in other words, the number of the second resistor, resistance adjusting sub-unit and third resistor can be increased or decreased according to the actual requirement. This design not only has good consistency, but also can achieve different requirements of rotation speed by increasing or decreasing the number, which can greatly reduce the development period of the apparatus for controlling the rotation speed and reduce the cost.

Figure 5:
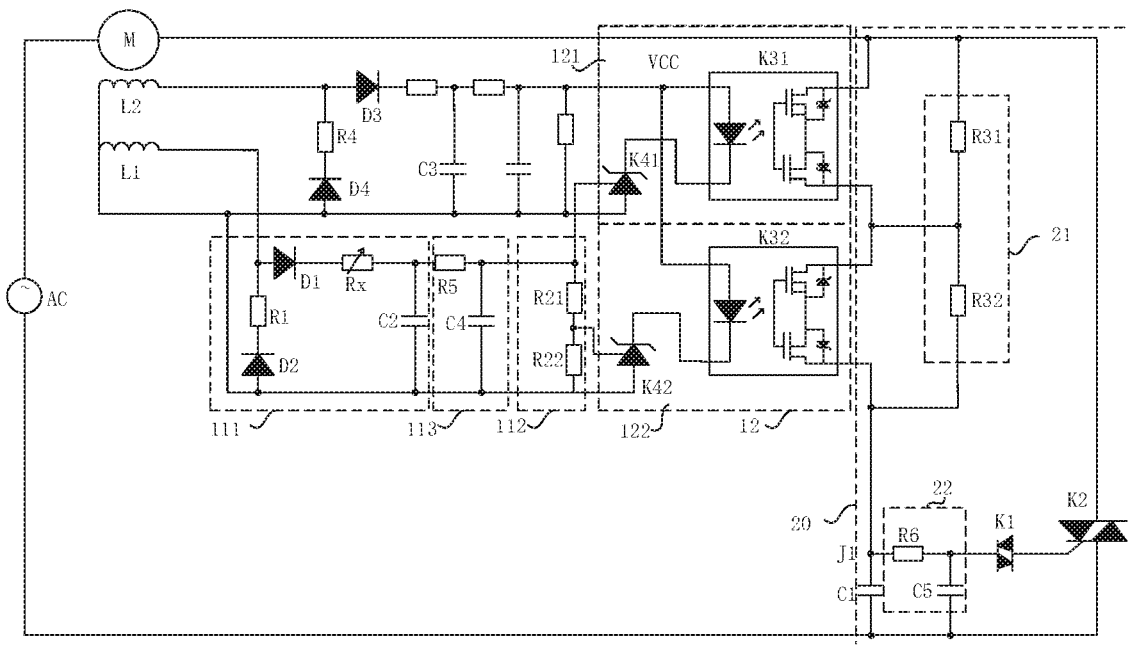
FIG. 5 is a circuit diagram of an apparatus for controlling a rotation speed of a motor according to another embodiment.

In one embodiment, as shown in FIG. 5, the apparatus for controlling the rotation speed of the motor further includes a power supply circuit. The power supply circuit includes a second inductance coil L2 and a second rectifier unit 31. The second inductance coil L2 is configured to induce the current rotation speed of the motor M and output a second AC voltage signal. The input end of the second rectifier unit 31 is connected to the second inductance coil L2 and configured to convert the second AC voltage signal into a second DC voltage signal and output through an output end of the second rectifier unit 31 to provide the trigger power supply ACC.

Furthermore, the second rectifier unit 31 includes: a third diode D3, a third capacitor C3, a fourth diode D4 and a fourth resistor R4. The anode of the third diode D3 is connected to one end of the second inductance coil L2; one end of the third capacitor C3 is connected to the cathode of the third diode D3, and the other end of the third capacitor C3 is connected to the other end of the second inductance coil L2; the cathode of the fourth diode D4 is connected to one end of the second inductance coil L2 through the fourth resistor R4, and the anode of the fourth diode D4 is connected to the other end of the second inductance coil L2.

Specifically, with reference to FIG. 5, the power supply circuit of the apparatus for control the rotation speed of the motor may consist of the second inductance coil L2 and the second rectifier unit 31, In the actual application, the second inductance coil L2 may be planted into the motor M, thus when the motor M is powered on, the rotor of the motor M is rotated, the magnet on the rotor cuts the second inductance coil L2, and the second inductance coil L2 will generate an induced electromotive force, which is an AC voltage signal, i.e., a second AC voltage signal. After that, the second rectifier unit 31 rectifies the second AC voltage signal, for example, through the third diode D3 and the third capacitor C3 in the second rectifier unit 31, to obtain the second DC voltage signal which is output through the output end of the second rectifier unit 31 to provide the trigger power supply ACC to the resistance adjusting sub-unit. In other words, the power supply needed by the resistance adjusting unit can be provided by the motor M. Compared with the traditional independent low-voltage power supply, it not only ensures the stability of the power supply, but also reduces standby power consumption.

Furthermore, as shown in FIG. 5, the second rectifier unit 31 further includes a seventh resistor R7 one end of which is connected to the cathode of the third diode D3, and the other end of the seventh resistor R7 is connected to one end of the third capacitor C3. The seventh resistor R7 functions to limit the current. In addition, the power supply circuit of the apparatus for controlling the rotation speed of the motor further includes an eighth resistor R8 which is connected in parallel with the third capacitor C3. The energy is released through the eighth resistor R8. In addition, the power supply circuit of the apparatus for controlling the rotation speed of the motor may further include a third filter unit 32 configured to filter the second DC voltage signal output from the second rectifier unit 31 to obtain a stable second DC voltage signal so as to ensure the stability of the trigger power supply VCC. Furthermore, the third filter unit 32 may be an RC filter circuit consisting of a ninth resistor R9 and a sixth capacitor C6, of course may be other filter circuit, not limited here.

The above-mentioned apparatus for controlling the rotation speed of the motor can not only implement accurate control of the rotation speed of the motor, but also has the advantages of simple structure, simple assembly, low cost, reliable performance, no manual correction, good consistency, and short development period.

Figure 6:
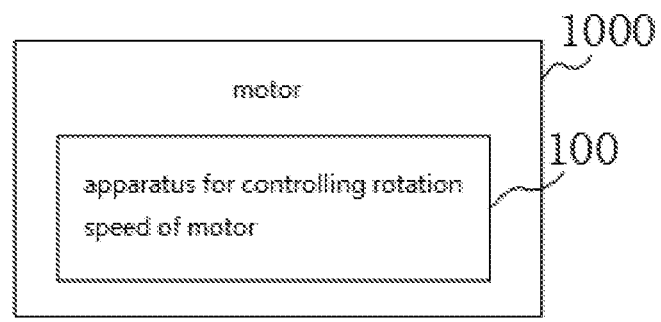
FIG. 6 is a block diagram of a motor according one embodiment.

In one embodiment, as shown in FIG. 6, a motor 1000 is further provided, which the above-mentioned apparatus 100 for controlling a rotation speed of a motor. The motor 1000 may be a DC motor or AC motor.

In the embodiment, the current rotation speed of the motor is induced and the rotation speed detection signal is output through the rotation speed inducing unit, and the total resistance of the resistor unit of the rotation speed control loop is adjusted according to the rotation speed detection signal through the resistance adjusting unit; and when the motor is powered on, the power supply charges the first capacitor through the motor and the resistor unit, the first controllable switch and the second controllable switch are turned on or off at the charging voltage of the first capacitor to adjust the rotation speed of the motor. Therefore, this not only enables automatic and accurate control of the rotation speed of the motor, such that the rotation speed of the motor can be automatically adjusted as the load changes, but also has the advantages of simple structure, simple assembly, low cost, reliable performance and no manual correction.

Figure 7:
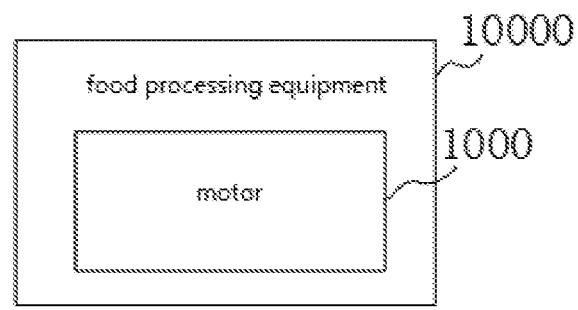
FIG. 7 is a block diagram of a food processing equipment according to one embodiment.

In one embodiment, as shown in FIG. 7, a food processing equipment 10000 is further provided, which includes the above-mentioned motor 1000. The food processing equipment 10000 may be an agitator, a crusher and so on.

In the embodiment, the current rotation speed of the motor is induced and the rotation speed detection signal is output though the rotation speed inducing unit, and the total resistance of the resistor unit of the rotation speed control loop is adjusted according to the rotation speed detection signal through the resistance adjusting unit; and when the motor is powered on, the power supply charges the first capacitor through the motor and the resistor unit, the first controllable switch and the second controllable switch are turned on or off at the charging voltage of the first capacitor to adjust the rotation speed of the motor. Therefore, this not only enables accurate control of the rotation speed of the motor, such that the rotation speed of the motor in the food processing equipment can be automatically adjusted as the load changes, but also has the advantages of simple structure, simple assembly, low cost, reliable performance and no manual correction.

Various technical features of the above embodiments can be combined discretionarily. In order to make the description concise, not all possible combinations of the various technical features in the above-mentioned embodiments are illustrated here. However, the combinations of these technical features, as long as no contradiction, should be considered to be within the scope of the disclosure.

The above-mentioned embodiments are merely illustrative of several embodiments of the present invention, and the description thereof is more specific and detailed, but is not understood as limiting the scope of the invention. It should be noted that a number of variations and modifications may be made by those skilled in the art without departing from the spirit of the disclosure, and these variations and modifications also belong to the scope of the disclosure. Therefore, the scope of the disclosure should be subject to the appended claims.

What is claimed is:

1. An apparatus for controlling a rotation speed of a motor, comprising: a rotation speed feedback circuit and a rotation speed control loop; wherein, the rotation speed feedback circuit comprises a rotation speed inducing unit configured to induce a current rotation speed of the motor and output a rotation speed detection signal, and a resistance adjusting unit configured to adjust a total resistance of a resistor unit of the rotation speed control loop according to the rotation speed detection signal;

the rotation speed control loop comprises the resistor unit, a first capacitor, a first controllable switch and a second controllable switch; one end of the first capacitor is connected to one end of the resistor unit and there is a first node between the resistor unit and the capacitor; the first node is connected to a first end of the first controllable switch, and a second end of the first controllable switch is connected to a control end of the second controllable switch; wherein, when the motor is powered on, a power supply charges the first capacitor through the motor and the resistor unit; the first controllable switch and the second controllable switch are turned on or off at a charging voltage of the first capacitor to adjust the rotation speed of the motor, wherein the rotation speed inducing unit comprises:

a first inductance coil, configured to induce the current rotation speed of the motor and output a first Alternating Current (AC) voltage signal;

a first rectifier unit, an input end of which is connected to the first inductance coil, configured to convert the first AC voltage signal into a first Direct Current (DC) voltage signal; and a voltage dividing unit, configured to perform a voltage division processing on the first DC voltage signal to obtain the rotation speed detection signal; the voltage dividing unit being connected to an output end of the first rectifier unit wherein the first rectifier unit comprises:

a first diode, an anode of the first diode being connected to one end of the first inductance coil;

a second capacitor, one end of the second capacitor being connected to a cathode of the first diode, the other end of the second capacitor being connected to the other end of the first inductance coil; and a second diode, a cathode of the second diode being connected to one end of the first inductance coil through a first resistor, and an anode of the second diode being connected to the other end of the first inductance coil.

2. The apparatus according to claim 1, wherein the first rectifier unit further comprises:

an adjustable resistor, one end of the adjustable resistor being connected to the cathode of the first diode, and the other end of the adjustable resistor being connected to one end of the second capacitor.

3. A motor, comprising the apparatus for controlling a rotation speed of a motor according to claim 1.

4. An apparatus for controlling a rotation speed of a motor, comprising:

a rotation speed feedback circuit and a rotation speed control loop;

wherein, the rotation speed feedback circuit comprises a rotation speed inducing unit configured to induce a current rotation speed of the motor and output a rotation speed detection signal, and a resistance adjusting unit configured to adjust a total resistance of a resistor unit of the rotation speed control loop according to the rotation speed detection signal;

the rotation speed control loop comprises the resistor unit, a first capacitor, a first controllable switch and a second controllable switch; one end of the first capacitor is connected to one end of the resistor unit and there is a first node between the resistor unit and the capacitor; the first node is connected to a first end of the first controllable switch, and a second end of the first controllable switch is connected to a control end of the second controllable switch; wherein, when the motor is powered on, a power supply charges the first capacitor through the motor and the resistor unit; the first controllable switch and the second controllable switch are turned on or off at a charging voltage of the first capacitor to adjust the rotation speed of the motor, wherein the rotation speed inducing unit comprises:

a first inductance coil, configured to induce the current rotation speed of the motor and output a first Alternating Current (AC) voltage signal;

a first rectifier unit, an input end of which is connected to the first inductance coil, configured to convert the first AC voltage signal into a first Direct Current (DC) voltage signal; and a voltage dividing unit, configured to perform a voltage division processing on the first DC voltage signal to obtain the rotation speed detection signal;

the voltage dividing unit being connected to an output end of the first rectifier unit, and wherein, the voltage dividing unit comprises N second resistors; the N second resistors are connected in series between both output ends of the first rectifier unit; each of the N second resistors corresponds to one rotation speed detection signal; wherein N is a positive integer;

the resistance adjusting unit comprises N resistance adjusting sub-units; a control end of a first one of the N resistance adjusting sub-units is connected to one end of a first one of the N second resistors, a control end of a (i+1)-th one of the N resistance adjusting sub-units is respectively connected to the other end of an i-th one of the N second resistors and one end of a (i+1)-th one of the N second resistors, a control end of a N-th one of the N resistance adjusting sub-units is respectively connected to the other end of a (N−1)-th one of the N second resistors and one end of a N-th one of the N second resistors, wherein 1≤i≤N, i is a positive integer;

the resistor unit comprises N third resistors which are connected in series; wherein, an output end of each one of the N resistance adjusting sub-units is connected in parallel with one third resistors, and each one of the N resistance adjusting sub-units is configured to adjust a parallel resistance of a corresponding third resistor according to a corresponding rotation speed detection signal, to adjust a total resistance of the resistor unit.

5. The apparatus according to claim 4, wherein each of the N resistance adjusting sub-units comprises:

a third controllable switch, a first end of the third controllable switch being connected to a trigger power supply, a second end of the third controllable switch being connected to one end of a corresponding third resistor, a third end of the third controllable switch being connected to the other end of the corresponding third resistor; and a fourth controllable switch, a first end of the fourth controllable switch being connected to a fourth end of the third controllable switch, a second end of the fourth controllable switch being connected to the other end of the first inductance coil, a control end of the fourth controllable switch being connected to a control end of the resistance adjusting sub-unit.

6. The apparatus according to claim 5, further comprising: a power supply circuit; wherein, the power supply circuit comprises:

a second inductance coil, configured to induce a current rotation speed of the motor and output a second AC voltage signal; and a second rectifier unit, an input end of which is connected to the second inductance coil, configured to convert the second AC voltage signal into a second DC voltage signal and output through an output end of the second rectifier unit to provide the trigger power supply.

7. The apparatus according to claim 6, wherein the second rectifier unit comprises:

a third diode, an anode of the third diode being connected to one end of the second inductance coil;

a third capacitor, one end of the third capacitor being connected to a cathode of the third diode, and the other end of the third capacitor being connected to the other end of the second inductance coil; and a fourth diode, a cathode of the fourth diode being connected to one end of the second inductance coil through a fourth resistor, and an anode of the fourth diode being connected to the other end of the second inductance coil.

8. A food processing equipment, comprising the motor according to claim 3.

* * * * *